(12) United States Patent  (10) Patent No.: US 8,305,723 B2
Vedula et al.  (45) Date of Patent: Nov. 6, 2012

(54) MOTOR DRIVE GROUND FAULT DETECTION

(75) Inventors: Sastry V. Vedula, Loves Park, IL (US); James J. Wrobel, Rockford, IL (US); Neal D. Clements, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/173,413

(22) Filed: Jun. 30, 2011

(65) Prior Publication Data

US 2011/0255198 A1  Oct. 20, 2011

Related U.S. Application Data

(63) Continuation of application No. 12/251,499, filed on Oct. 15, 2008, now abandoned.

(51) Int. Cl.
 H02H 3/00 (2006.01)
(52) U.S. Cl. .............................. 361/88; 361/42; 361/91.1
(58) Field of Classification Search ........................ None
See application file for complete search history.

(56) References Cited

U.S. PATENT DOCUMENTS

| | | | |
|---|---|---|---|
| 4,525,764 A | 6/1985 | Titus | |
| 4,672,501 A * | 6/1987 | Bilac et al. | 361/96 |
| 4,713,608 A | 12/1987 | Catiller et al. | |
| 5,493,868 A * | 2/1996 | Kikuiri et al. | 62/129 |
| 6,043,664 A * | 3/2000 | Kliman et al. | 324/545 |
| 6,246,332 B1 | 6/2001 | Hubbard | |
| 6,252,751 B1 | 6/2001 | Rozman | |
| 6,516,279 B1 * | 2/2003 | Jansen et al. | 702/66 |
| 6,850,043 B1 | 2/2005 | Maddali | |
| 7,016,171 B2 | 3/2006 | Bax et al. | |
| 7,215,519 B2 | 5/2007 | Blumenauer et al. | |
| 7,221,142 B2 * | 5/2007 | Murray et al. | 324/117 R |
| 7,233,463 B2 | 6/2007 | Langford et al. | |
| 7,254,004 B2 | 8/2007 | Mladenik et al. | |
| 7,272,514 B2 | 9/2007 | Qi et al. | |
| 7,292,011 B2 | 11/2007 | Beneditz | |
| 7,312,965 B2 | 12/2007 | Bax | |
| 7,375,937 B2 | 5/2008 | Bax et al. | |
| 2005/0036248 A1 | 2/2005 | Klikic et al. | |
| 2008/0151445 A1 * | 6/2008 | Leppanen | 361/43 |

FOREIGN PATENT DOCUMENTS

JP 07-007841 * 10/1995
TW 239133 9/2005

* cited by examiner

*Primary Examiner* — Jared Fureman
*Assistant Examiner* — Terrence Willoughby
(74) *Attorney, Agent, or Firm* — Carlson, Gaskey & Olds PC

(57) ABSTRACT

A motor drive ground fault detection device operates by computing the total RMS voltage of all the phases, and comparing the total RMS voltage to a threshold to determine if a ground fault has occurred.

15 Claims, 8 Drawing Sheets

MOTOR DRIVE GROUND FAULT DETECTION

RELATED APPLICATION

This application is a continuation of U.S. patent application Ser. No. 12/251,499, filed on Oct. 15, 2008 now abandoned.

BACKGROUND OF THE INVENTION

This application relates to a ground fault detection method and device for a system where a high common mode choke condition exists.

Modern aircraft electrical systems receive electrical power from three-phase generators which are mechanically connected to the turbines of the aircraft engines. In typical systems the electricity produced by a generator may contain variations due to electrical noise or other factors. Such electricity may not be suitable for use with sensitive on-board electronics found in most aircraft. In order to condition the electricity, most applications connect the generator output to an inverter/conditioner which conditions the power to be in an acceptable form. A side effect of the conditioning is that a high common mode choke may be needed. Among other known effects, the common mode choke prevents current from exceeding a certain value, even in the case of a ground fault.

A ground fault may occur for any number of reasons such as the mechanical touching of wires, failure of components, or improper connections. A phase to ground fault occurs where a direct electrical connection is created between one phase of a multiphase system and electrical ground. This results in a phase imbalance and may disrupt electrical systems and may cause physical damage to the electrical system.

Various methods have been employed in an attempt to detect a ground fault so that the faulty generator may be isolated from the system and potential damage from the imbalance prevented. One scheme to detect a ground fault compares the current on each phase of the electrical system to a threshold, and when the current exceeds the threshold a phase to ground fault is determined to be present. Such a method will operate in any system without a common mode choke since the direct link to ground will short circuit the load and all the power will flow to ground, resulting in a large current spike. These systems measure the current output from the generator, and when the current on a single phase increases by a certain amount (typically 5 to 6 amperes) a phase to ground fault is determined to exist. The scheme may be inoperable when a high common mode choke is present since the common mode choke prevents an increase in current.

SUMMARY OF THE INVENTION

Disclosed is a method for detecting a ground fault in a poly-phase electrical system where the total root mean square voltage of all the phases is computed, and the resulting value is compared to a threshold. If the resulting value exceeds the threshold then a ground fault is determined to have occurred.

These and other features of the present invention can be best understood from the following specification and drawings, the following of which is a brief description.

DETAILED DESCRIPTION OF THE PREFERRED EMBODIMENT

Figure 1:
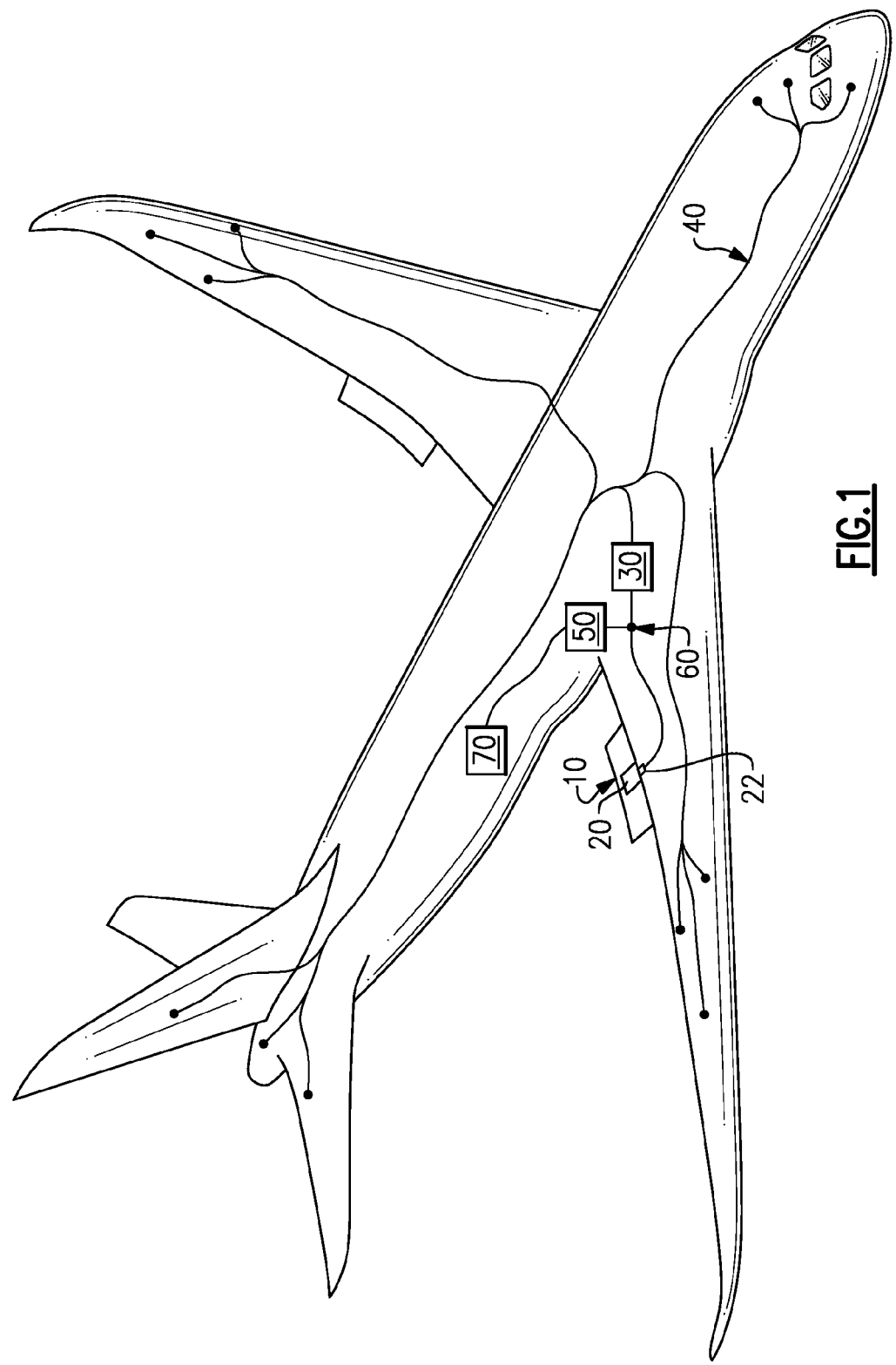
FIG. 1 is a simplified illustration of an airplane electrical system with a device according to the present application installed.

A simplified airplane electrical system, such as the one illustrated in FIG. 1, generates power in a generator 20 which is mechanically connected to an engine 10. The power created by the generator 20 is then sent to an inverter/conditioner 30. The inverter/conditioner 30 modifies the electrical power output of the generator 20 to make the electrical power have more constant power attributes. After the electrical power has been conditioned the power is then sent through the aircraft's electrical distribution system 40 to onboard electrical devices/drives (such as sensors, gauges, meters, pumps, fans, etc.).

The introduction of the inverter/conditioner 30 may also introduce a common mode choke. As described above, a common mode choke has the practical effect of limiting the possible current, which can potentially interfere with known ground fault detection schemes. The effect of the common mode choke on a ground fault detector can be addressed by introduction of a controller 50 and a voltage sensor 60 to the electrical system. The controller 50 can determine if a ground fault condition exists based on the total root mean square (RMS) voltage of the inverter/conditioner 30 AC input.

An electrical system without a ground fault condition is a balanced system. In a balanced system the magnitude of each AC signal is identical, and each signal is phase shifted from the nearest phase by 360/N where N is the number of phases. By way of example, in a balanced three phase system the power output of Phase A will not be shifted, Phase B will be shifted by 120 degrees, and Phase C will be shifted by 240 degrees. As a result of the equal magnitude and proportional phase shifting at any given time the sum of Phases A, B, and C will be equal to zero in a theoretical balanced system.

When a phase to ground fault is present in a power system, the system is thrown out of balance since one phase will have a direct connection to ground, while the other phases must still pass through a load and return to the generator. As a result of the imbalance, the total RMS voltage on the phase with a ground fault will be significantly greater than zero. A controller 50 and voltage sensors 60 may thereby be utilized to monitor the sum of the phase voltages to determine if the sum is above a certain threshold. When the sum exceeds the threshold, a ground fault is determined to be present on one of the phases. The generator with the phase to ground fault can then be identified and isolated from the electrical system.

Figure 2:
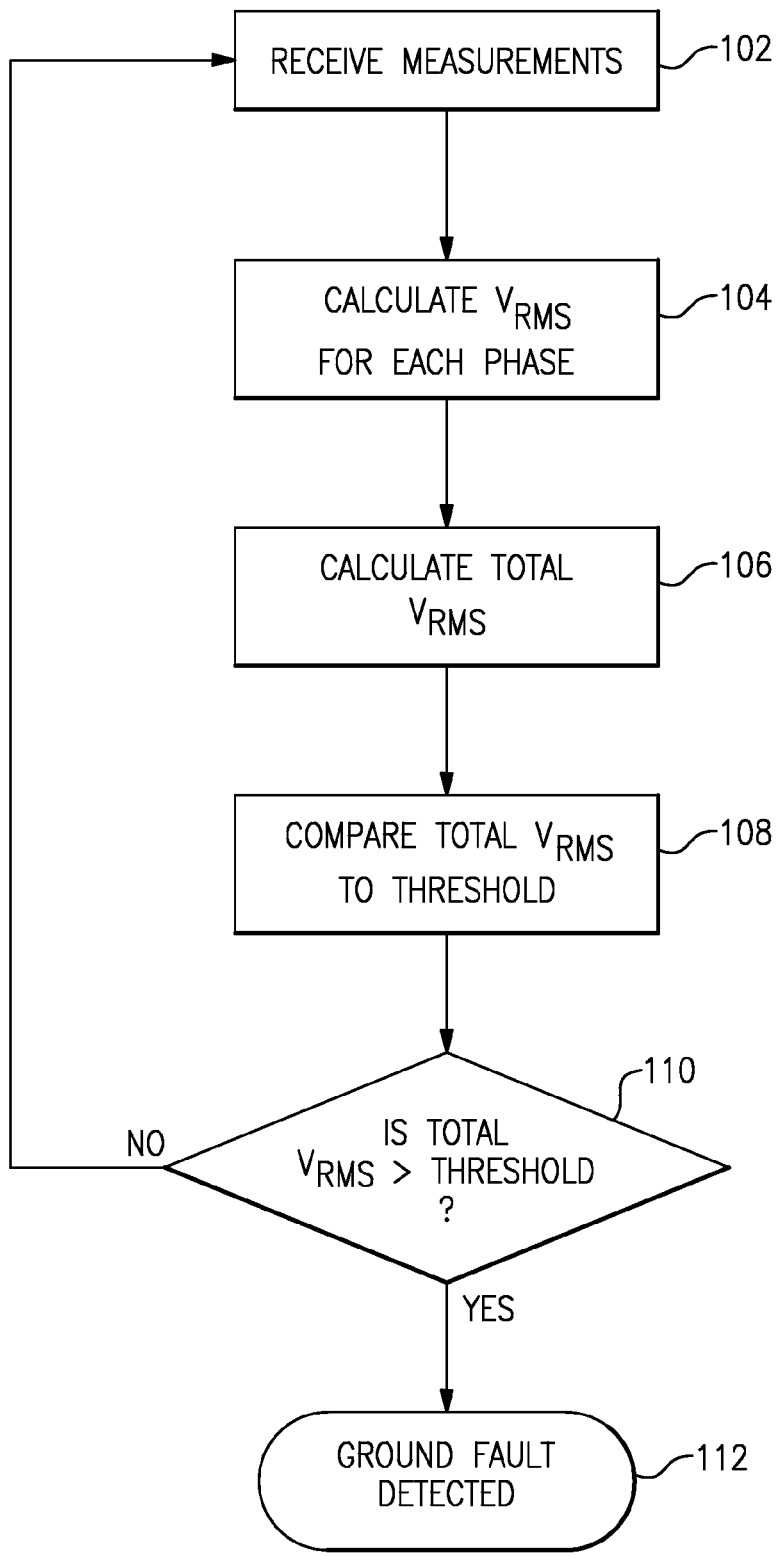
FIG. 2 is a flowchart illustrating a first embodiment of the disclosed method.

FIG. 2 illustrates an embodiment of the above described method for detecting a phase to ground fault based on RMS voltage. In the first step of the method, the voltage sensor 60 measures the inverter/conditioner 30 AC input voltage and sends the voltage measurements to the controller 50 (Step 102, FIG. 2). In order to make a ground fault determination based on the voltage measurements, the controller 50 then calculates an RMS voltage for each phase (step 104, FIG. 2). After the phase RMS voltages are calculated, the controller 50 calculates a sum of all of the phase voltages for the electrical system and derive its rms value, referred to as "total Vrms" (step 106, FIG. 2). In most applications the electrical system will have three phases; however it is known that an alternate number of phases could be used.

Once a total RMS voltage value has been calculated, the controller 50 compares the total RMS voltage value to a threshold value (step 108, FIG. 2). If the total RMS voltage exceeds the threshold then a phase to ground fault is found (step 110, FIG. 2). When a phase to ground fault is found, the controller 50 then either takes a predefined action (such as isolating the faulty inverter), or transmits a ground fault detected signal to a second controller 70, which then allows the second controller 70 to take any necessary actions (step 112, FIG. 2).

Figure 3:
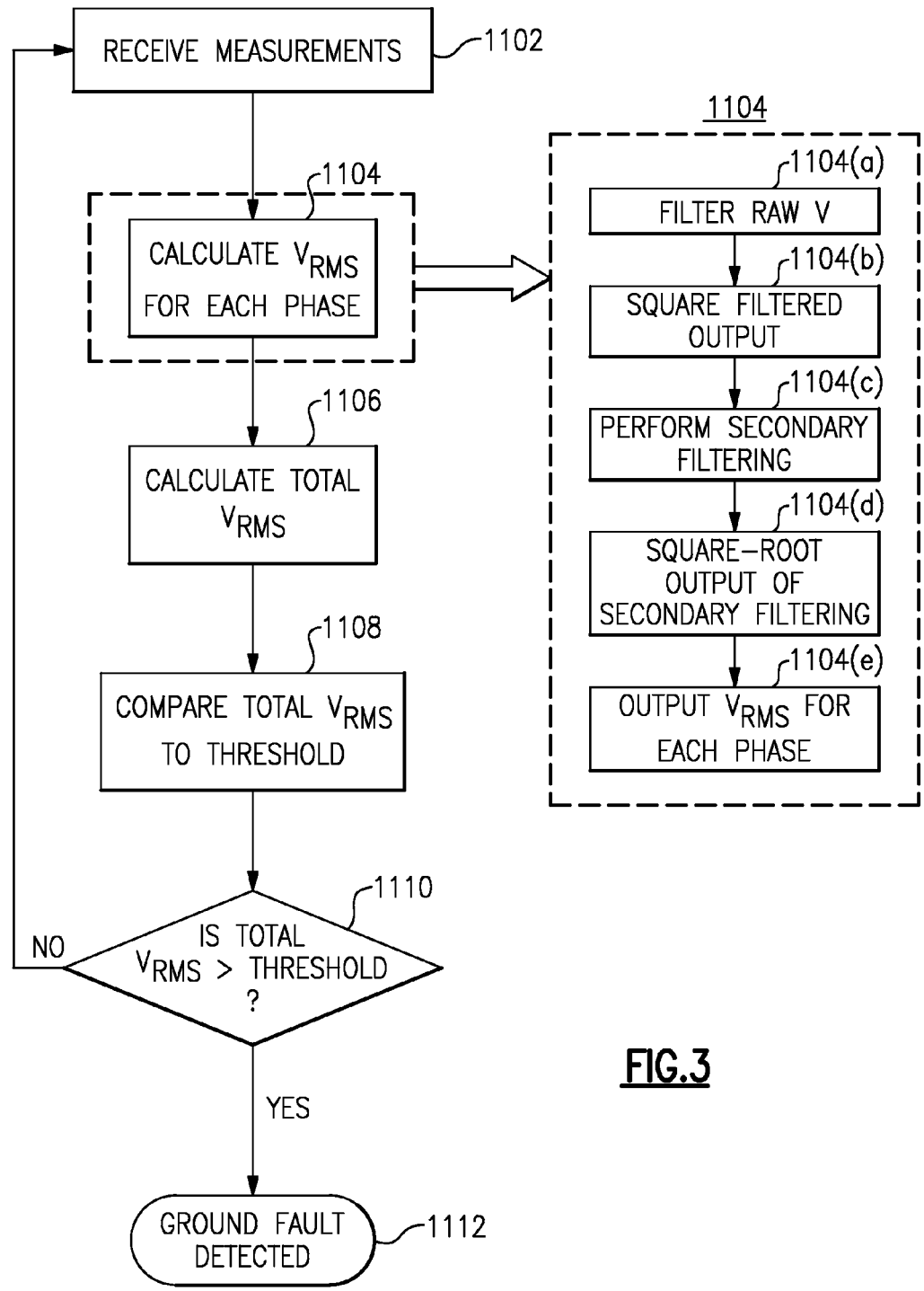
FIG. 3 is a flowchart illustrating a second embodiment of the disclosed method.

In another embodiment, the RMS voltage value of each phase (i.e., step 104) can be determined by the method illustrated in FIG. 3. In the embodiment of FIG. 3, step 1104 first filters the raw voltage to remove harmonic frequencies (step 1104(*a*)). The harmonic frequencies are removed because the harmonic frequencies are unnecessary in the determination of the phase RMS voltage, and can cause miscalculations when the phase voltages are summed.

The filtered voltage is then squared (step 1104(*b*)) and passed to a second filter. In the second filter the signal is again filtered (step 1104(*c*)) to remove harmonic frequencies. Since the second filter is after the squaring operation, any harmonics that were too small to be filtered in the first filter step 1104(*a*) will have been squared and thus are large enough to be filtered by the second filter step 1104(*c*). The signal is then square rooted (step 1104(*d*)), which returns the signal to its original amplitude without the harmonics. The signal is then sent to step 1106 of FIG. 3 where the remainder of the method is identical to the method described in the first embodiment, and illustrated in FIG. 2.

Figure 5:
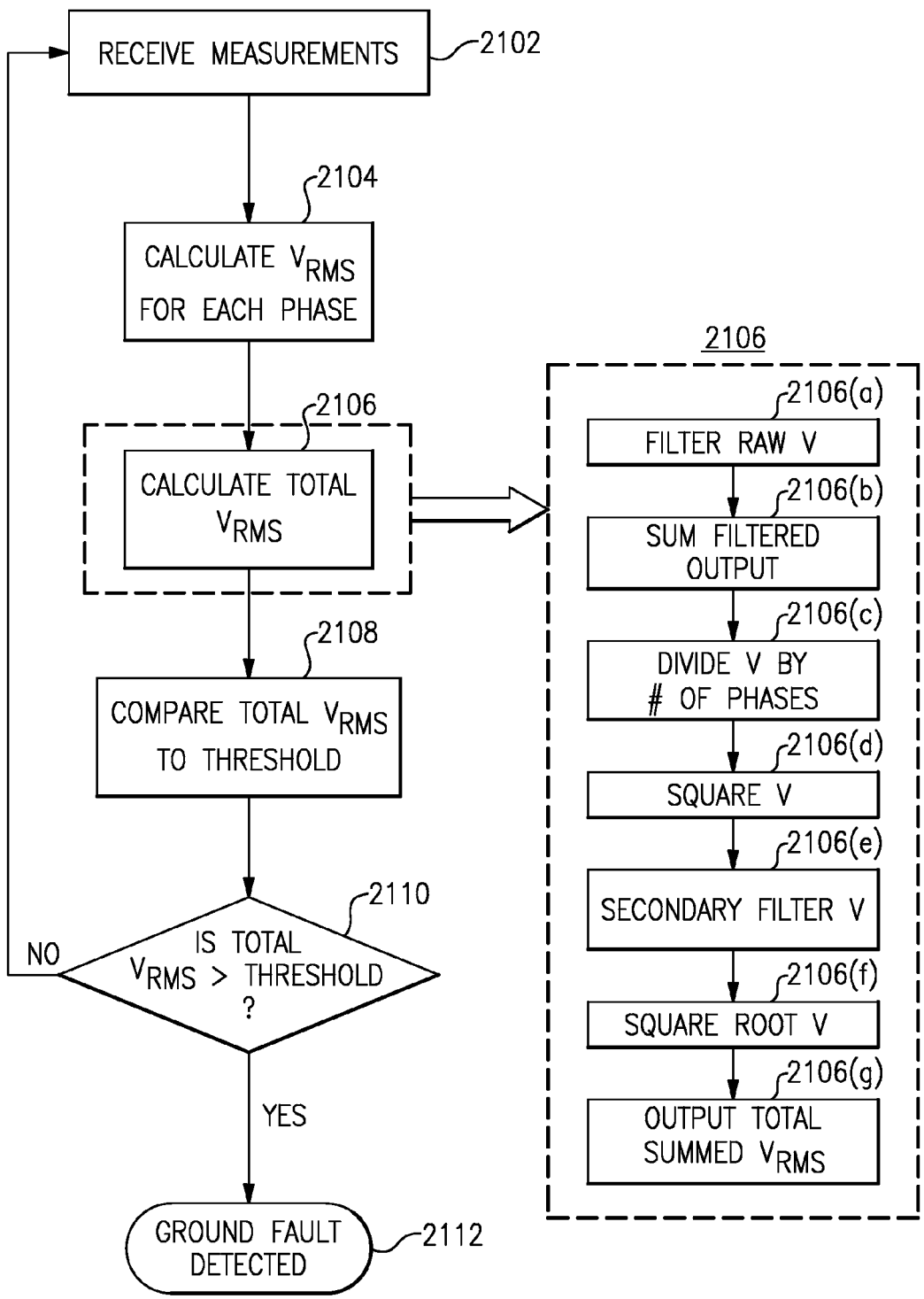
FIG. 5 is a flowchart illustrating a third embodiment of the disclosed method.

In another embodiment the total RMS voltage is computed for step 2106 of FIG. 5 with the sub-steps illustrated. In the embodiment of FIG. 5, a raw voltage for each phase is received from step 2104 and initially filtered (step 2106(*a*)). The filtered voltages of each phase are then added together (step 2106(*b*)) and sent to a divider. The divider then divides the sum of the phase voltages by the total number of phases in the system (step 2106(*c*)).

Next the output of the divider is squared (step 2106(*d*)) in order to make any harmonics that were too small for the first filter (2106(*a*)) larger. After being squared, the signal is again filtered (step 2106(*e*)). The output of the second filter (step 2106(*e*)) is square-rooted (step 2106(*f*)). Finally the total RMS voltage value is output (step 2106(*g*)) and sent to step 2108 (FIG. 5).

Figure 6:
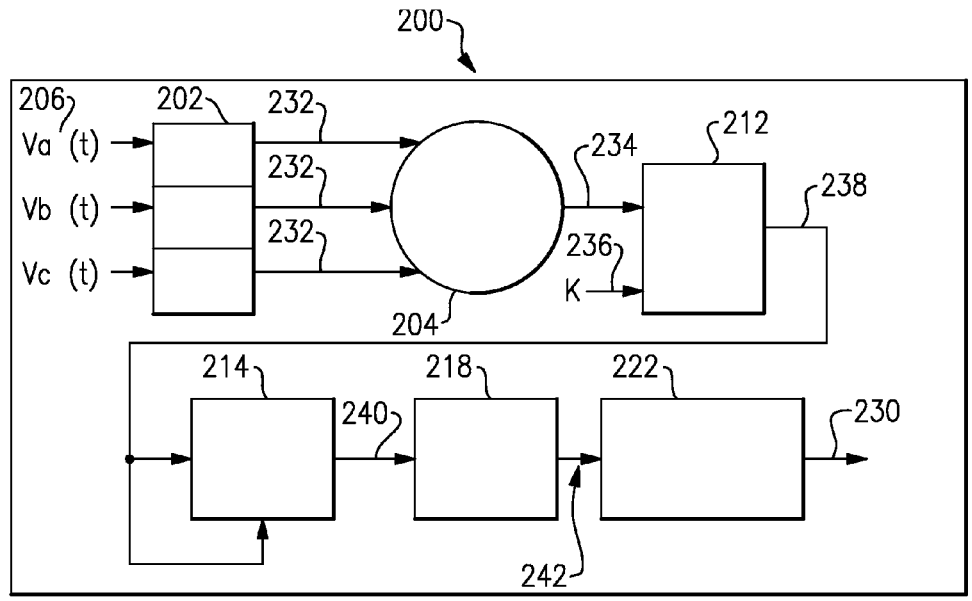
FIG. 6 is a logic diagram illustrating a logic circuit capable of performing a portion of the third embodiment of the disclosed method.

FIG. 6 illustrates a logic circuit 200 for a voltage summer which is capable of performing the steps shown in block 2106 of FIG. 5, and described above. The total RMS voltage evaluator 200 accepts a voltage input 206 of all three phases. The voltage inputs 206 are then filtered in low pass filters 202 to remove harmonics and leave a cleaner AC signal. The filtered voltage signals 232 are then sent to a summer 204. The summer 204 combines the filtered voltage signals 232 and outputs a single raw combined voltage signal 234.

Due to the nature of the summer 204 the raw combined 3-phase voltage signal 234 is larger than zero in the event of a ground fault. The raw combined voltage signal 234, is sent to a divider 212. The divider 212 additionally has a second input 236 equal to K. The divider 212 then divides the raw combined voltage by K and outputs a combined voltage value 238. The K value for input 236 is the number of phases and may be determined by a signal from the controller 50, the secondary controller 70, predefined within the divider 212, or set using any other known technique.

For the combined voltage value 238 to be properly interpreted by the controller 50, harmonics that survived the initial filter 202, and that were introduced as a result of the summer 204 and the divider 212 operations, must be removed from the signal 238. To remove the remaining harmonics the signal 238 is squared (in multiplier block 214), then sent through a filter 218, and then square-rooted (in square-root block 222). The square root block 222 outputs a total RMS voltage signal 230 which is in a format that can be accepted and interpreted by the controller 50. These operations remove the minor harmonics in the same manner as described in the second embodiment. The output 230 is then passed to step 2108 of FIG. 5.

Figure 7:
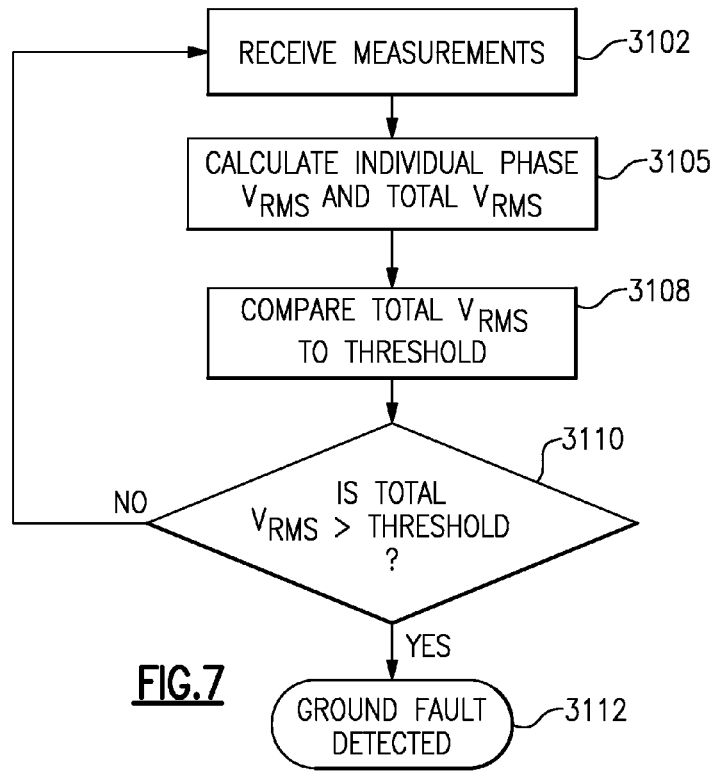
FIG. 7 is a flowchart illustrating a fourth embodiment of the disclosed method.
Figure 8:
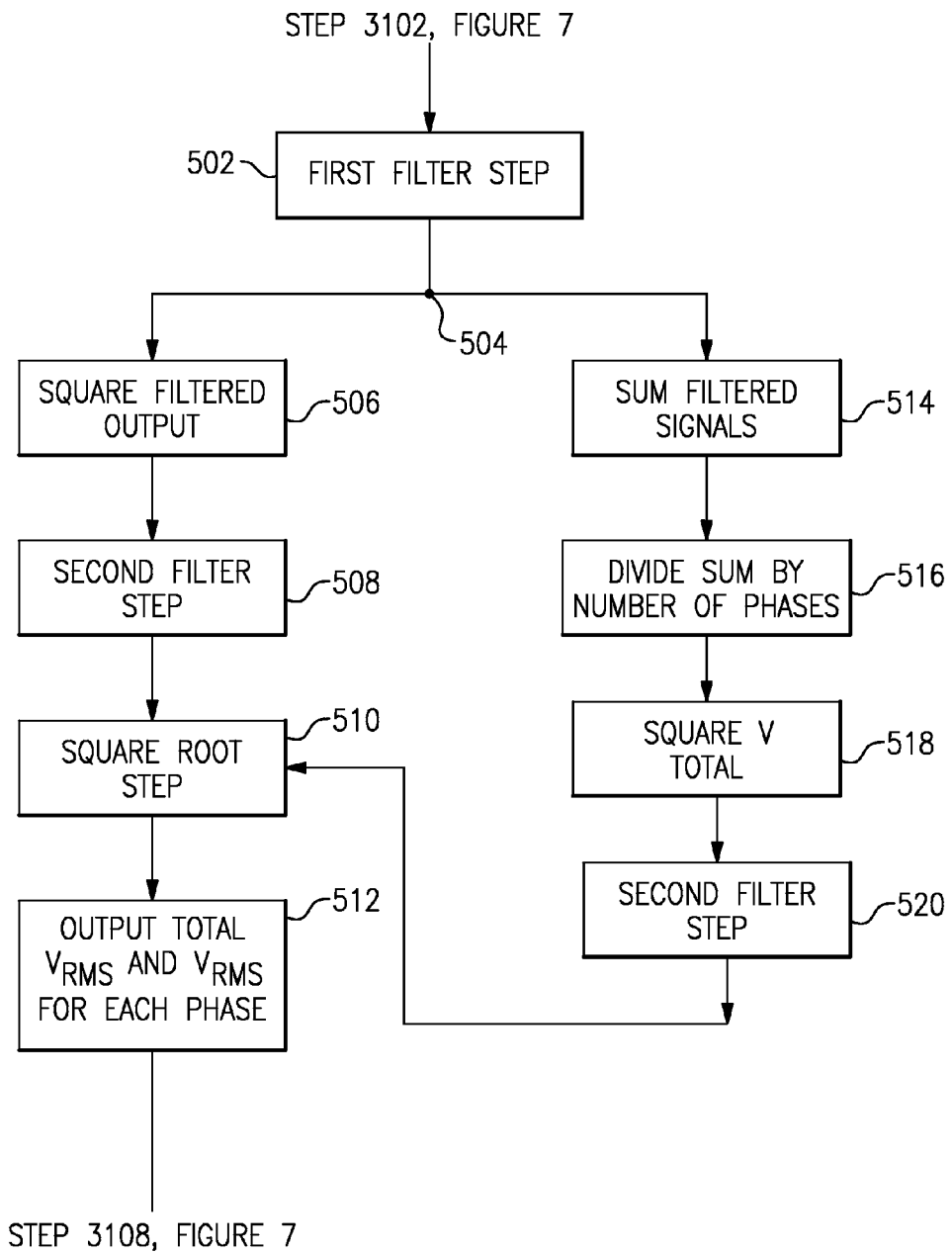
FIG. 8 is a flowchart illustrating a method for calculating phase RMS voltage and total RMS voltage step of FIG. 7.

Another embodiment of the ground fault detection method combines the phase RMS voltage calculations (step 104, FIG. 2) with the total RMS voltage calculations (step 106, FIG. 2), resulting in the method illustrated in FIGS. 7, 8. After the raw measurements are received (step 3102, FIG. 7), the measurements are filtered (step 502) to remove harmonic frequencies. Next the filtered signals are copied at junction 504 and separate operations are performed on the signals simultaneously (as illustrated in FIG. 8).

The first operation, used to calculate phase voltage, of the embodiment of FIG. 7 squares the phase voltages (step 506) from junction 504. Then, the voltage signals are again filtered (step 508). After the second filter the signal is combined with the output of the second operation and square rooted (step 510). After being square rooted the voltage signals are output to step 3108 of FIG. 7 (step 512).

The second operation, used to calculate total RMS voltage of the embodiment of FIG. 7, sums the filtered signals from junction 504 (step 514). The summed signal is then divided by the total number of phases in the system (step 516), and the resulting signal is squared (step 518). After being squared the signal is again filtered (step 520) and combined with the output of the first operation where the signal is square-rooted (step 510) and output to step 3108 of FIG. 7 (step 512).

While it is known that the above described methods can be performed using a number of different controllers and logic circuits, disclosed below are sample logic circuits which could be used by the controller 50 to perform the above described methods.

Figure 4:
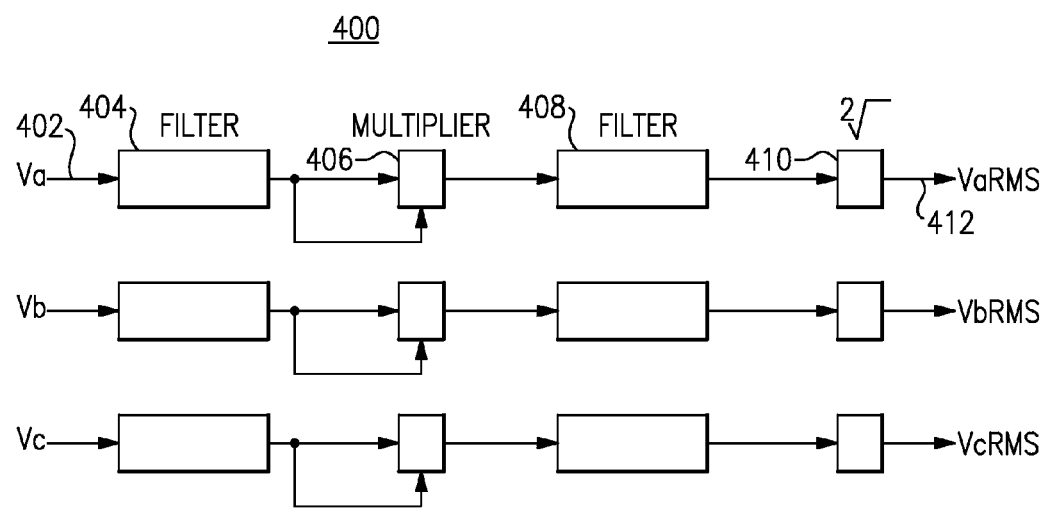
FIG. 4 is a logic diagram illustrating a logic circuit capable of performing a portion of the second embodiment of the disclosed method.

The logic circuit 400 of FIG. 4 is capable of performing step 1104 of the embodiment of FIG. 3. The logic circuit initially accepts raw AC phase voltage measurements 402 from the sensor 60 and passes them through a low pass filter 404. The signal is then sent to a multiplier 406. The multiplier 406 accepts the filtered AC input signal twice and multiplies them together, resulting in a squaring operation. The squaring operation additionally squares minor harmonics that were too small to be removed by the initial low-pass filter 404.

The signal is then sent through a second low-pass filter 408 where the remaining harmonics are removed, resulting in a clean signal that can be properly read by a controller 50. Finally the signal is square rooted in logic block 410, which results in an output signal 412 equal to the phase RMS voltage without additional harmonics.

Figure 9:
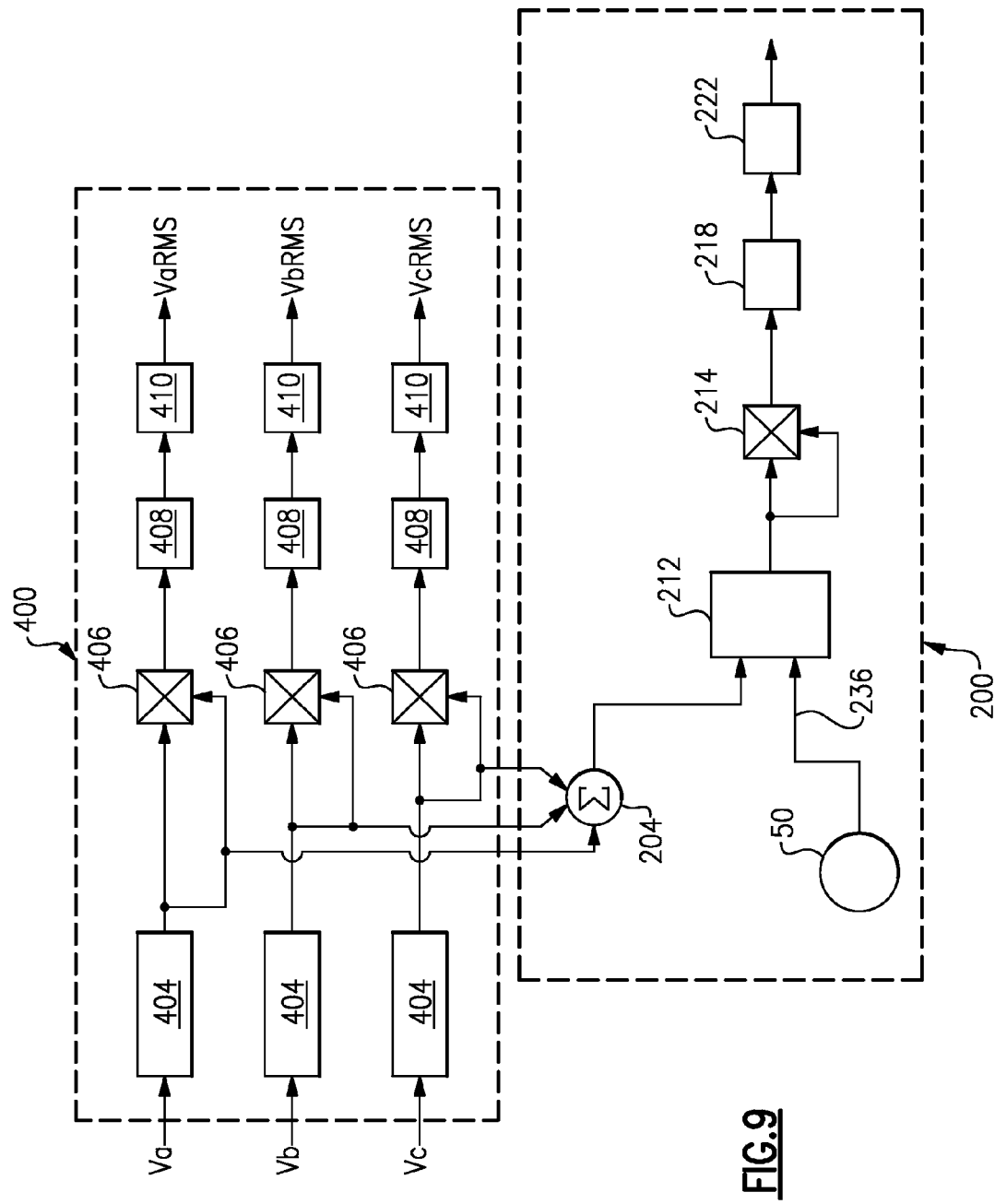
FIG. 9 is a logic diagram illustrating a logic circuit capable of performing a portion of the fourth embodiment of the disclosed method.

A logic circuit which is a combination of the logic circuits of FIG. 4 and FIG. 6, and capable of performing the method of FIGS. 7, 8, is disclosed in FIG. 9. The Logic Circuit of FIG. 9 utilizes a combined first low pass filter 404, and then separates into two separate sub-circuits corresponding to each of the logic circuits 400, 200 of FIGS. 4 and 6. These circuits have identical components and operate in the same manner as the logic circuits 200, 400 described above.

The foregoing description shall be interpreted as illustrative and not in any limiting sense. A worker of ordinary skill in the art would recognize that certain modifications, such as utilizing a different logic circuit within a controller, would come within the scope of this invention. For that reason, the following claims should be studied to determine the true scope and content of this invention.

What is claimed is:

1. A method for detecting a ground fault in an AC electrical system comprising:
    detecting an AC input voltage of all phases of an inverter:
    computing a combined Root Means Square (RMS) voltage of all phases of said inverter by computing a combined Root Means Square (RMS) voltage of all phases of said inverter using said AC input voltage;
    comparing the combined RMS voltage to a threshold; and
    performing a specified action when the combined RMS voltage exceeds the threshold.

2. The method of claim 1 wherein said computing a combined RMS voltage additionally comprises:
    computing a phase voltage for each of the at least one phases; and
    summing each of the phase voltages, thereby computing a combined RMS voltage.

3. The method of claim 2 comprising the additional step of processing a raw AC voltage input prior to the step of computing a combined RMS voltage.

4. The method of claim 2 wherein the step of computing a combined RMS voltage further comprises filtering the phase voltage of each of the at least one phases.

5. The method of claim 4 wherein the step of computing a combined RMS voltage further comprises filtering a combined voltage value prior to the step of comparing the combined RMS voltage value to a threshold.

6. The method of claim 2 comprising the additional step of processing a raw AC voltage input prior to the step of computing a combined RMS voltage, and
    wherein the step of computing a combined RMS voltage further comprises filtering the phase voltage of each of the at least one phases.

7. The method of claim 6 wherein the step of computing a combined RMS voltage further comprises filtering a combined voltage value prior to the step of comparing the combined RMS voltage value to a threshold.

8. The method of claim 1 wherein said performing a specified action when the combined RMS voltage exceeds the threshold comprises transmitting a ground fault detected signal to a controller.

9. The method of claim 8 further comprising said controller disconnecting a generator from the electrical system when a ground fault detected signal is received.

10. A non-transitory computer readable medium containing instructions for performing the steps of:
    detecting an AC input voltage of all phases of an inverter;
    computing a combined Root Means Square (RMS) voltage of all phases of said inverter by computing a combined Root Means Square (RMS) voltage of all phases of said inverter using said AC input voltage;
    comparing the combined RMS voltage to a threshold; and
    performing a specified action when the combined RMS voltage exceeds the threshold.

11. An electrical system comprising:
    a ground fault detection device for detecting phase to ground fault conditions, said ground fault detection device comprising a voltage sensor connected to an AC input of each phase of an inverter;
    a voltage summer capable of summing a Root Means Square (RMS) voltage of all phases of the inverter using a sensed AC input of each phase of an inverter;
    a voltage comparator for comparing a summed RMS voltage against a threshold; and
    a ground fault detected signal transmitter for transmitting a ground fault detected signal when the summed RMS voltage exceeds the threshold.

12. The electrical system of claim 11 wherein each of said voltage sensors are capable of computing a phase RMS voltage based at least in part on the sensed voltage.

13. The electrical system of claim 11 wherein said voltage summer additionally comprises at least a first filter for filtering sensed voltage values.

14. The electrical system of claim 13 wherein said voltage summer additionally comprises a second filter for filtering at least partially processed voltage values.

15. The electrical system of claim 11, additionally comprising a switch operable to disconnect a generator from said inverter in response to said ground fault detected signal.

* * * * *